(12) United States Patent
Kim et al.

(10) Patent No.: US 9,091,892 B2
(45) Date of Patent: Jul. 28, 2015

(54) LIQUID CRYSTAL DISPLAY AND MANUFACTURING METHOD THEREOF

(71) Applicant: SAMSUNG DISPLAY CO., LTD., Yongin, Gyeonggi-Do (KR)

(72) Inventors: Sung Man Kim, Seoul (KR); Yeong-Keun Kwon, Yongin-si (KR); Duk-Sung Kim, Asan-si (KR); Min-Chul Song, Cheonan-si (KR); Eu Gene Lee, Asan-si (KR); Soo Jung Chae, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/208,262

(22) Filed: Mar. 13, 2014

(65) Prior Publication Data

US 2014/0267999 A1    Sep. 18, 2014

(30) Foreign Application Priority Data

Mar. 15, 2013   (KR) .................. 10-2013-0027893

(51) Int. Cl.
*G02F 1/1345*    (2006.01)
*G02F 1/1341*    (2006.01)

(52) U.S. Cl.
CPC ............ *G02F 1/1345* (2013.01); *G02F 1/1341* (2013.01); *G02F 1/13452* (2013.01); *G02F 1/13454* (2013.01)

(58) Field of Classification Search
CPC .............. G02F 1/13452; G02F 1/1345; G02F 1/13454; G02F 1/1341
See application file for complete search history.

(56) References Cited

U.S. PATENT DOCUMENTS

| 7,196,759 | B2 | 3/2007 | Ahn et al. |
| 7,545,463 | B2 | 6/2009 | Park |
| 7,609,354 | B2 | 10/2009 | Konno et al. |
| 7,714,974 | B2 | 5/2010 | Lee et al. |
| 7,843,545 | B2 | 11/2010 | Jung et al. |
| 7,960,914 | B2 | 6/2011 | Hara et al. |
| 2009/0073364 | A1 | 3/2009 | Matsuno |

FOREIGN PATENT DOCUMENTS

| JP | 09-258205 | 10/1997 |
| JP | 2001-203460 | 7/2001 |
| JP | 2009-300648 | 12/2009 |
| JP | 2012-137710 | 7/2012 |
| KR | 1020040025472 | 3/2004 |
| KR | 1020080077831 | 8/2008 |
| KR | 1020090054194 | 5/2009 |
| KR | 1020110066737 | 6/2011 |

*Primary Examiner* — Phu Vu
(74) *Attorney, Agent, or Firm* — F. Chau & Associates, LLC

(57) ABSTRACT

A liquid crystal display includes a first substrate, gate lines and data lines disposed on a display area of the first substrate, a common voltage line disposed on a peripheral area of the first substrate, a common voltage transmission unit extending from the common voltage line, an organic layer disposed on the common voltage transmission unit and the common voltage line, a connecting member disposed on the organic layer disposed on the peripheral area, a first insulating layer disposed on the pixel electrode and the connecting member, a common electrode disposed on the first insulating layer, and a short point connecting the connecting member and the common electrode to each other. The common electrode and the first insulating layer include a plurality of cutouts in the peripheral region and display region of the first substrate which have substantially a same plane shape as each other.

20 Claims, 16 Drawing Sheets

LIQUID CRYSTAL DISPLAY AND MANUFACTURING METHOD THEREOF

CROSS-REFERENCE TO RELATED APPLICATION

This application claims priority to Korean Patent Application No. 10-2013-0027893 filed on Mar. 15, 2013, the disclosure of which is hereby incorporated by reference herein in its entirety.

TECHNICAL FIELD

The present disclosure relates to a liquid crystal display and a manufacturing method thereof.

DISCUSSION OF THE RELATED ART

Liquid crystal displays (LCDs) are one of the most widely used flat panel displays, and they display images by applying voltages to field-generating electrodes to generate an electric field in a liquid crystal (LC) layer that determines orientations of LC molecules therein to adjust polarization of incident light.

The liquid crystal display has certain benefits in that it is may be readily manufactured having a light weight and thin formation t. However, there may also be certain difficulties associated with a liquid crystal display such as, for example, that lateral visibility may be lower than front visibility. Consequently, driving methods of various types have been developed to overcome these difficulties. To realize a wide viewing angle, a liquid crystal display forming a pixel electrode and a common electrode on one substrate has been spotlighted.

In the case of the liquid crystal display of this shape, at least one of the two field generating electrodes of the pixel electrode and the common electrode has a plurality of cutouts and a plurality of branch electrodes defined by the plurality of cutouts.

When forming two field generating electrodes on one display panel, to respectively form the field generating electrodes, different photomasks may be required which may thereby result in an increase in the manufacturing costs associated therewith.

Also, when connecting the common electrodes applied with a voltage of a constant magnitude, a signal applied to the common electrode may be delayed.

SUMMARY

Exemplary embodiments of the present invention provide a liquid crystal display preventing an increasing of a manufacturing cost and a signal delay of a common electrode while forming two field generating electrodes on one display panel, and a manufacturing method thereof.

A liquid crystal display according to an exemplary embodiment of the present invention includes: a first substrate having a display area configured to display an image and a peripheral area disposed near the display area, a plurality of gate lines and a plurality of data lines disposed on the display area of the first substrate, a common voltage line disposed on the peripheral area of the first substrate, a common voltage transmission unit extending from the common voltage line, a plurality of thin film transistors respectively connected to the plurality of gate lines and the plurality of data lines, an organic layer disposed on the plurality of thin film transistors, the common voltage line, and the common voltage transmission unit, a plurality of pixel electrodes disposed on the organic layer disposed on the display area of the first substrate, a connecting member disposed on the organic layer disposed on the peripheral area of the first substrate, a first insulating layer disposed on the pixel electrode and the connecting member and a common electrode disposed on the first insulating layer. The common electrode has a plurality of first cutouts formed in the display area, the first insulating layer has a plurality of second cutouts formed in the display area, the first cutouts and the second cutouts have substantially a same plane shape as each other, the common electrode has a plurality of third cutouts formed in the peripheral area, the first insulating layer has a plurality of fourth cutouts formed in the peripheral area. The third cutouts and the fourth cutouts have substantially a same plane shape as each other. In addition, the liquid crystal display further includes a short point connecting the connecting member disposed in the peripheral area and the common electrode to each other.

The organic layer may have a contact hole exposing the common voltage line and the common voltage transmission unit, the common voltage line exposed through the contact hole may be covered by the connecting member, at least a portion of the connecting member may be exposed through the third cutout and the fourth cutout, and the short point may cover the connecting member exposed through the third cutout and the fourth cutout and the common electrode together.

The common voltage line may be formed from a same layer as the gate line or the data line.

The short point may include a plurality of short balls.

At least a portion of the plurality of short balls may overlap the contact hole.

A diameter of the short ball may be larger than a cross-sectional width of the contact hole.

The diameter of the short ball may be larger than a width of the third cutout or and an interval between neighboring third cutouts.

The plurality of short balls may include a first short ball and a second short ball having different diameters.

The liquid crystal display may further include a sealant formed according to the peripheral area, and at least a portion of the short balls may overlap the sealant.

The short point may include a metal paste.

A manufacturing method of a liquid crystal display according to an exemplary embodiment of the present invention includes: providing a first substrate having a display area configured to display an image and a peripheral area disposed near the display area, forming a plurality of gate lines and a plurality of data lines on the display area of the first substrate; forming a common voltage line and a common voltage transmission unit extending from the common voltage line on the peripheral area of the first substrate, forming a plurality of thin film transistors respectively connected to the plurality of gate lines and the plurality of data lines, forming an organic layer on the plurality of thin film transistors, the common voltage line, and the common voltage transmission unit, forming a plurality of pixel electrodes on the organic layer disposed on the display area of the first substrate, forming a connecting member on the organic layer disposed on the peripheral area of the first substrate, forming a first insulating layer and a common electrode having a cutout on the pixel electrode and the connecting member and forming a short point connecting the connecting member disposed in the peripheral area and the common electrode to each other.

The organic layer may be formed to have a contact hole exposing the common voltage line and the common voltage transmission unit, the connecting member may cover the common voltage line exposed through the contact hole, at least a portion of the connecting member may be exposed by the cutout, and the short point may cover the connecting member exposed through the cutout and the common electrode together.

The common voltage line may be formed from a same layer as the gate line or the data line.

The formation of the short point may include disposing a plurality of short balls.

At least a portion of the plurality of short balls may be disposed overlapping the contact hole.

A diameter of the short ball may be larger than a cross-sectional width of the contact hole.

The diameter of the short ball may be larger than a width of the cutout or an interval between the neighboring cutouts.

The plurality of short balls may include a first short ball and a second short ball having different diameters.

The manufacturing method of the liquid crystal display may further include forming a sealant according to the peripheral area, and at least a portion of the short balls may overlap the sealant.

The formation of the short point may include connecting the connecting member and the common electrode by a metal paste.

In accordance with an exemplary embodiment of the present invention, a liquid crystal display is provided. The liquid crystal display includes a first substrate having a display area configured to display an image and a peripheral area disposed near the display area.

The first substrate includes a plurality of gate lines disposed on the display area of the first substrate, a gate insulating layer disposed on the gate lines, a semiconductor disposed on the gate insulating layer, a common voltage line disposed on the peripheral area of the first substrate, a common voltage transmission unit extending from the common voltage line, a plurality of thin film transistors respectively connected to the plurality of gate lines and the plurality of data lines, a first passivation layer disposed on the data lines and the gate insulating layer, a color filter disposed on the first passivation layer of the first substrate, a light blocking member disposed on the first passivation layer of the first substrate at a region corresponding to the gate lines and the data lines, a plurality of pixel electrodes disposed on the color filter disposed on the display area of the first substrate, a connecting member disposed on the common voltage line and the common voltage transmission unit, a second passivation layer disposed on the pixel electrodes, a common electrode disposed on the second passivation layer, and a short point connecting the connecting member disposed in the peripheral area and the common electrode to each other. The common electrode and the second passivation layer have substantially a same shape as each other such that boundaries of the second passivation layer overlap boundaries of the common electrode. Also, the common electrode has a plurality of first cutouts and the second passivation layer has a plurality of second cutouts and wherein the plurality of first cutouts of the common electrode and the plurality of second cutouts of the second passivation layer have substantially a same shape as each other such that boundaries of first cutouts of the common electrode overlap boundaries of the second cutouts of the second passivation layer.

In addition, the liquid crystal display further includes a second substrate facing the first substrate and a liquid crystal layer disposed between the first substrate and the second substrate.

According to the liquid crystal display and the manufacturing method according to an exemplary embodiment of the present invention, the increase of the manufacturing cost and the signal delay of the common electrode may be prevented while forming two field generating electrodes on one substrate.

BRIEF DESCRIPTION OF THE DRAWINGS

Exemplary embodiments of the present invention can be understood in more detail from the following detailed description taken in conjunction with the attached drawings in which:

FIG. 14 to FIG. 21 are cross-sectional views sequentially showing a manufacturing method of a liquid crystal display according to an exemplary embodiment of the present invention taken along the line VIII-VIII of FIG. 7.

DETAILED DESCRIPTION OF EXEMPLARY EMBODIMENTS OF THE PRESENT INVENTION

Figure 1:
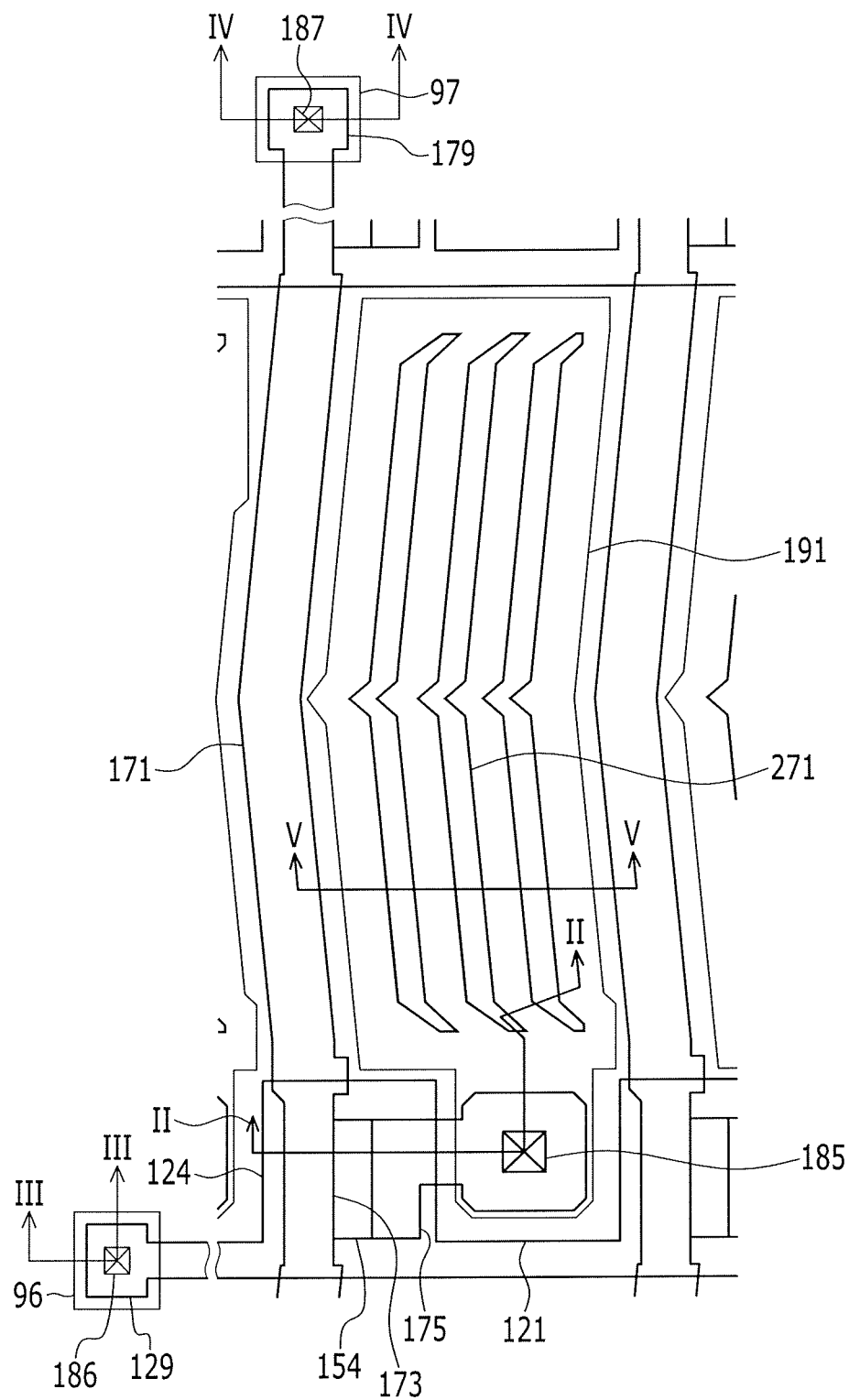
FIG. 1 is a layout view of a liquid crystal display according to an exemplary embodiment of the present invention.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Now, a liquid crystal display according to an exemplary embodiment of the present invention will be described with reference to the drawings.

Figure 2:
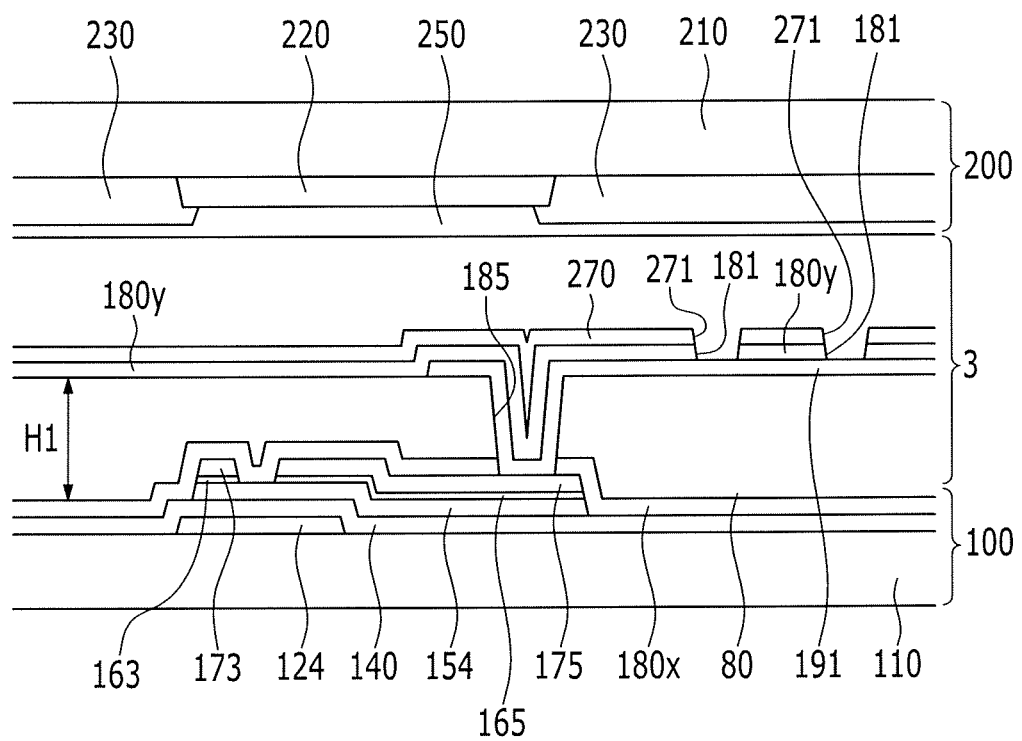
FIG. 2 is a cross-sectional view of the liquid crystal display of FIG. 1 taken along the line II-II.
Figure 3:
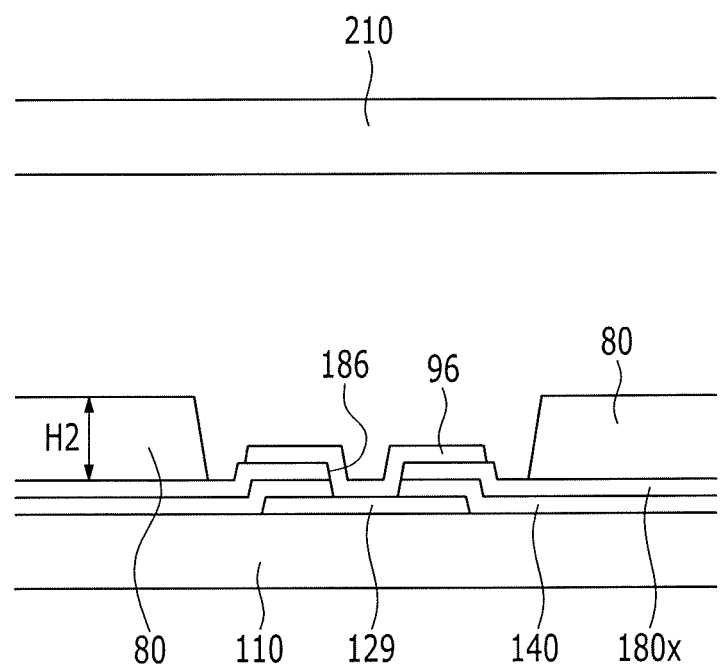
FIG. 3 is a cross-sectional view of the liquid crystal display of FIG. 1 taken along the line III-III.
Figure 4:
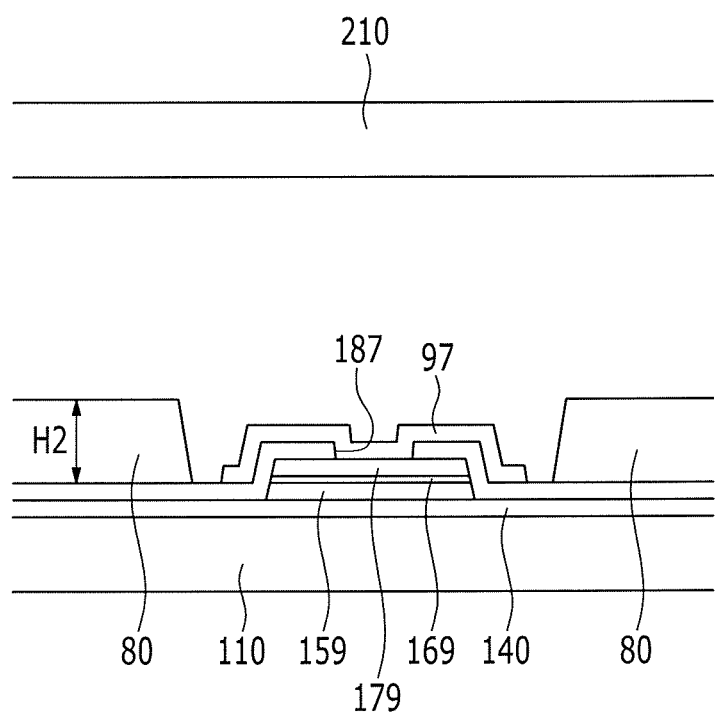
FIG. 4 is a cross-sectional view of the liquid crystal display of FIG. 1 taken along the line IV-IV.

Firstly, a liquid crystal display according to an exemplary embodiment of the present invention will be described with reference to FIG. 1 to FIG. 4. FIG. 1 is a layout view of a liquid crystal display according to an exemplary embodiment of the present invention. FIG. 2 is a cross-sectional view of the liquid crystal display of FIG. 1 taken along the line II-II, FIG. 3 is a cross-sectional view of the liquid crystal display of FIG. 1 taken along the line III-III, and FIG. 4 is a cross-sectional view of the liquid crystal display of FIG. 1 taken along the line IV-IV.

Referring to FIG. 1 to FIG. 4, a liquid crystal display according to an exemplary embodiment of the present invention includes, for example, a lower panel 100 and an upper panel 200 facing each other, and a liquid crystal layer 3 interposed therebetween.

Firstly, the lower panel 100 will be described.

A gate conductor including a gate line 121 is formed on a first insulating substrate 110 formed of, for example, transparent glass, quartz, plastics, or the like. Also, in an exemplary embodiment, the first insulating substrate 110, may be formed of, for example, ceramic or silicon materials. Further, in an exemplary embodiment, the first insulating substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The gate line 121 includes, for example, a gate electrode 124, and a gate pad portion 129 for connection with another layer or an external driving circuit. The gate line 121 may be made of, for example, an aluminum-based metal such as aluminum (Al) or an aluminum alloy, a silver-based metal such as silver (Ag), a copper-based metal such as copper (Cu), a molybdenum-based metal such as molybdenum (Mo), chromium (Cr), tantalum (Ta), titanium (Ti), nickel (Ni), tungsten (W), gold (Au), palladium (Pd), platinum (Pt), neodymium (Nd), zinc (Zn), cobalt (Co), manganese (Mn) or any alloys thereof. However, the gate line 121 is not limited to the above structure. For example, in an exemplary embodiment, the gate line 121 may have a multilayered structure including at least two conductive layers having different physical properties.

A gate insulating layer 140 formed of, for example, silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or the like is formed on the gate conductors 121, 124, and 129. However, the gate insulating layer 140 is not limited to the above structure. For example, in an exemplary embodiment the gate insulating layer 140 may have a multilayered structure including at least two insulating layers having different physical properties.

A semiconductor 154 made of, for example, amorphous silicon, polysilicon, micro-crystal silicon, single crystal silicon or the like is formed on the gate insulating layer 140. The semiconductor 154 may include, for example, an oxide semiconductor.

Ohmic contacts 163 and 165 are formed on the semiconductor 154. The ohmic contacts 163 and 165 may made of a material such as, for example, n+ hydrogenated amorphous silicon in which an n-type impurity such as phosphorus is doped at a high concentration, or the ohmic contacts 163 and 165 may be formed of a silicide. The ohmic contacts 163 and 165 may form, for example, a pair disposed on the semiconductor 154. In the case where the semiconductor 154 is an oxide semiconductor, the ohmic contacts 163 and 165 may be omitted.

A data conductor including a data line 171 including, for example, a source electrode 173 and a drain electrode 175 is formed on the ohmic contacts 163 and 165 and the gate insulating layer 140.

The data line 171 includes, for example, a data pad portion 179 for connection with another layer or an external driving circuit. The data line 171 transports a data signal and mainly extends, for example, in a vertical direction to cross the gate line 121.

In this case, the data line 171 may have, for example, a first bent portion having a bent shape to obtain maximum transmittance of the liquid crystal display, and the bent portions may meet each other in a middle region of the pixel region to form a V shape. In addition, for example, a second bent portion that is bent so as to form a predetermined angle with the first bent portion may be further included in the middle region of the pixel region.

The first bent portion of the data line 171 may be bent so as to form an angle of, for example, about 7° with a vertical reference line y forming an angle of 90° in an extension direction of the gate line 121. The second bent portion disposed in the middle region of the pixel region may be further bent so as to form about an angle of, for example, about 7° to about 15° with the first bent portion.

The source electrode 173 is a portion of the data line 171, and is disposed on the same line as the data line 171. The drain electrode 175 is formed so as to extend, for example, in parallel to the source electrode 173. Accordingly, the drain electrode 175 is, for example, parallel to a portion of the data line 171.

The drain electrode 175 includes, for example, one end of a bar type and the other having a wide area that faces the source electrode 173 with respect to the gate electrode 124.

Also, for example, a first semiconductor 159 and first contact assistants 169 are disposed under the data pad portion 179. Alternatively, in an exemplary embodiment, the first semiconductor 159 and the first contact assistants 169 may be omitted.

The gate electrode 124, the source electrode 173, and the drain electrode 175 form a thin film transistor (TFT) as a switching element along with the semiconductor 154, and a channel of the thin film transistor is formed in the semiconductor 154 between the source electrode 173 and the drain electrode 175.

The liquid crystal display according to the present exemplary embodiment of the present invention may include, for example, the source electrode 173 disposed on the same line as the data line 171 and the drain electrode 175 extending in parallel to the data line 171 to increase a width of the thin film transistor while the area of the data conductor is not increased, thereby increasing an opening ratio of the liquid crystal display.

However, alternatively in an exemplary embodiment, the source electrode 173 and the drain electrode 175 may different shapes.

For example, the data line 171 and the drain electrode 175 be made of a refractory metal such as molybdenum (Mo), chromium (Cr), tantalum (Ta), titanium (Ti), tungsten (W) or an alloy thereof, and may have a multilayered structure including a refractory metal layer (not shown) and a low resistance conductive layer (not shown). Examples of the multilayered structure may include but are not limited to a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be made of various metals or conductors in addition to this. For example, in addition to the above metals, in an embodiment, the data line 171 and the drain electrode 175 may also include other metals such as nickel (Ni), gold (Au), palladium (Pd), platinum (Pt), neodymium (Nd), zinc (Zn), cobalt (Co), manganese (Mn) or any alloys thereof in a single or multi-layered structure.

A first passivation layer 180x is disposed on the data conductors 171, 173, 175, and 179, the gate insulating layer 140, and exposed portions of the semiconductor 154. The first passivation layer 180x may be formed of, for example, an organic insulating material, an inorganic insulating material, or the like. For example, in an exemplary embodiment, the first passivation layer 180x may be formed of an inorganic insulating material such as silicon nitride (SiNx), silicon oxide (SiOx) or a combination thereof. Alternatively, in an exemplary embodiment, the first passivation layer 180x may be formed of an organic insulating material such as, for example, benzocyclobutene (BCB), an acryl-based resin, a polyimide resin or a combination thereof.

An organic layer 80 is formed on the first passivation layer 180x. For example, the organic layer 80 is thicker than the first passivation layer 180x and may have a substantially flat surface.

A first thickness H1 of the organic layer 80 disposed in a display area where a plurality of pixels are disposed to display an image is, for example, larger than a second thickness H2 of the organic layer 80 disposed at a peripheral area where the gate pad portion 129 or the data pad portion 179 are disposed.

The organic layer 80 is disposed, for example, at the display area in which a plurality of pixels are disposed, but may not be disposed at a peripheral area in which the gate pad portion 129 or the data pad portion 179 are formed.

Alternatively, in an exemplary embodiment of the present invention, the organic layer 80 may be omitted.

The organic layer 80 is, for example, removed at a region corresponding to the drain electrode 175, the gate pad portion 129, and the data pad portion 179.

A first contact hole 186 exposing the gate pad portion 129 is formed in the first passivation layer 180x, and the gate insulating layer 140 disposed at the region corresponding to the gate pad portion 129 and the organic layer 80 is removed.

A second contact hole 187 exposing the data pad portion 179 is formed in the first passivation layer 180x disposed at the region corresponding to the data pad portion 179 and the organic layer 80 is removed.

The organic layer 80 and the first passivation layer 180x disposed at the region corresponding to the drain electrode 175 have a third contact hole 185.

A pixel electrode 191 is formed on the organic layer 80. The pixel electrode 191 includes, for example, a curved edge that is substantially parallel to the first bent portion and the second bent portion of the data line 171.

The pixel electrode 191 is formed of, for example, a transparent conductive layer including a material such as indium tin oxide (ITO), indium zinc oxide (IZO), cadmium tin oxide (CTO), aluminum zinc oxide (AZO), indium tin zinc oxide (ITZO), cadmium oxide (CdO), hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO).

The pixel electrode 191 is physically and electrically connected to the drain electrode 175 through, for example, the third contact hole 185 formed in the organic layer 80 and the first passivation layer 180x thereby receiving a voltage from the drain electrode 175.

A first contact assistant 96 is formed on the gate pad portion 129 exposed through the first contact hole 186, and a second contact assistant 97 is formed on the data pad portion 179 exposed through the second contact hole 187.

The pixel electrode 191, the first contact assistant 96, and the second contact assistant 97 may be, for example, simultaneously formed from the same layer.

A second passivation layer 180y is formed on the pixel electrode 191, and a common electrode 270 is formed on the second passivation layer 180y. The second passivation layer 180y may be formed of, for example, an organic insulating material, an inorganic insulating material, or the like. For example, in an exemplary embodiment, the second passivation layer 180y may be formed of an inorganic insulating material such as silicon nitride (SiNx), silicon oxide (SiOx) or a combination thereof. Alternatively, in an exemplary embodiment, the second passivation layer 180y may be formed of an organic insulating material such as, for example, benzocyclobutene (BCB), an acryl-based resin, a polyimide resin or a combination thereof.

The common electrode 270 is formed of, for example, a transparent conductive layer including a material such as indium tin oxide (ITO), indium zinc oxide (IZO), cadmium tin oxide (CTO), aluminum zinc oxide (AZO), indium tin zinc oxide (ITZO), cadmium oxide (CdO), hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO).

The second passivation layer 180y and the common electrode 270 disposed on the second passivation layer 180y have, for example, substantially the same plane shape as one another. Accordingly, boundaries of the second passivation layer 180y overlap boundaries of the common electrode 270.

The second passivation layer 180y and the common electrode 270 are disposed, for example, in the display area where a plurality of pixels are disposed, but are not disposed at the peripheral area where the gate pad portion 129 and the data pad portion 179 are formed.

The common electrode 270 has, for example, a plurality of first cutouts 271 and the second passivation layer 180y has, for example, a plurality of second cutouts 181. The first cutout 271 of the common electrode 270 and the second cutout 181 of the passivation layer 180y have, for example, substantially the same plane shape as one another. Accordingly, boundaries of the first cutout 271 overlap boundaries of the second cutout 181.

Although not shown, an alignment layer is coated on the pixel electrode 191 exposed by the second cutout 181 of the second passivation layer 180y and the common electrode 270, and the alignment layer may be, for example, a horizontal alignment layer and is rubbed in a predetermined direction. However, alternatively in an exemplary embodiment of the present invention, the alignment layer may include, for example, an optical reaction material to be optically aligned.

Now, the upper display panel 200 will be described.

A light blocking member 220 is formed on a second insulating substrate 210 made of, for example, transparent glass, quartz, plastic, or the like. Also, in an exemplary embodiment, the second insulating substrate 210, may be formed of, for example, ceramic or silicon materials. Further, in an exemplary embodiment, the second insulating substrate 210 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof. The light blocking member 220 is also called a black matrix and prevents light leakage.

A plurality of color filters 230 are formed on the second substrate 210.

An overcoat 250 is formed on the color filter 230 and the light blocking member 220. The overcoat 250 is made of, for example, an (organic) insulator, prevents exposure of the color filter 230, and provides a flat surface. Alternatively, in an exemplary embodiment, the overcoat 250 may be omitted.

The alignment layer may be disposed on the overcoat 250.

The liquid crystal layer 3 includes, for example, a nematic liquid crystal material having positive dielectric anisotropy. For example, liquid crystal molecules of the liquid crystal layer 3 are arranged so that a long axis direction thereof is parallel to the upper and lower display panels 100 and 200, and the liquid crystal molecules have a twisted spiral structure where an angle thereof is about 90° from the rubbing direction of the alignment layer of the lower display panel 100 to the upper display panel 200.

The pixel electrode 191 receives a data voltage from the drain electrode 175, and the common electrode 270 receives a common voltage having a predetermined magnitude from a common voltage application portion disposed outside of the display region.

The liquid crystal molecules of the liquid crystal layer 3 disposed on the two electrodes 191 and 270 are rotated in a direction that is, for example, parallel to a direction of an electric field when generating the electric field by the pixel electrode 191 and the common electrode 270 that are the field generating electrodes. As described above, according to the determined rotation direction of the liquid crystal molecule, the polarization of light passing through the liquid crystal layer is changed.

In the liquid crystal display according to an exemplary embodiment of the present invention, the second passivation layer 180y disposed on the pixel electrode 191 and the common electrode 270 disposed on the second passivation layer 180y have, for example, substantially the same plane shape as one another. For example, the common electrode 270 has a plurality of the first cutouts 271, the second passivation layer 180y has a plurality of second cutouts 181, and the first cutouts 271 and the second cutouts 181 have substantially the same plane shape as one another.

Therefore, the second passivation layer 180y and the common electrode 270 may be formed, for example, together by using one photomask.

Accordingly, an increase of the manufacturing cost of the liquid crystal display may be prevented.

In the liquid crystal display according to the present exemplary embodiment shown in FIG. 1 to FIG. 4, the organic layer 80 is disposed on the first passivation layer 180x of the lower panel 100, and the upper panel 200 includes, for example, the color filter 230 and the light blocking member 220. However, alternatively, in an exemplary embodiment of the present invention, the color filter 230 instead of the organic layer 80 may be disposed on the lower panel 100, and the upper panel 200 may not include the color filter 230. In this case, the light blocking member 220 may also be disposed, for example, on the lower panel 100 rather than the upper panel 200.

Figure 5A:
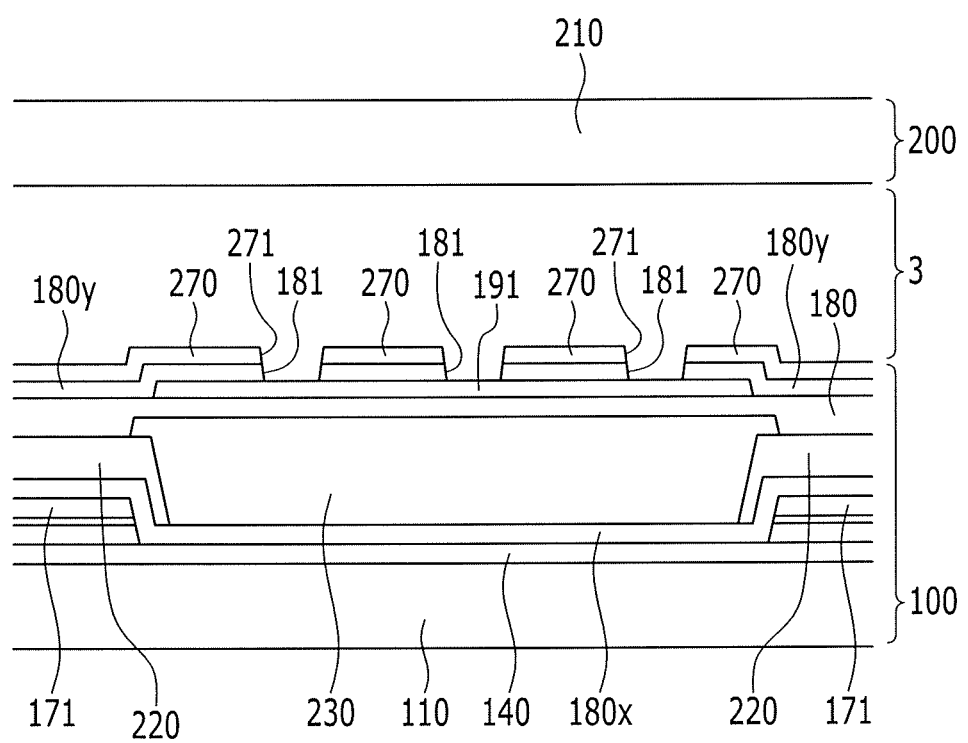
FIG. 5A to FIG. 5C are cross-sectional views of a liquid crystal display according to an exemplary embodiment of the present inventions taken along the line III-III of FIG. 1.
Figure 5B:
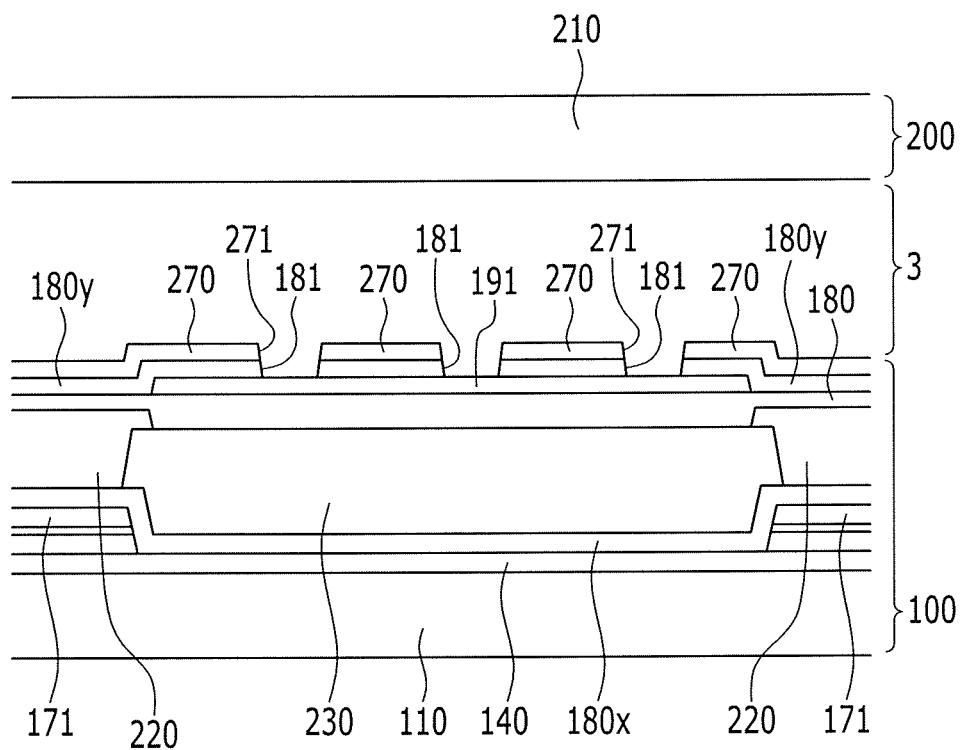
Figure 5C:
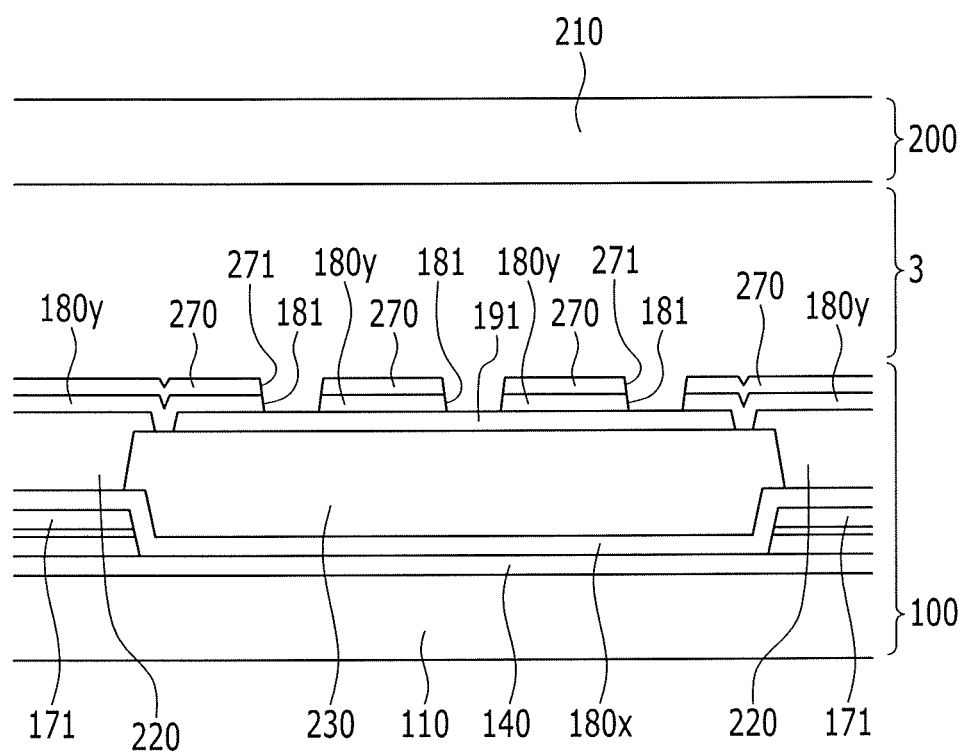

Next, this will be described with reference to FIG. 5A to FIG. 5C. FIG. 5A to FIG. 5C are cross-sectional views of a liquid crystal display according to an exemplary embodiment of the present inventions taken along the line of FIG. 1.

Referring to FIG. 5A, the light blocking member 220 is disposed on the first passivation layer 180x of the lower panel 100. The light blocking member 220 is disposed at, for example, a region corresponding to the gate line 121 and the data line 171. The color filter 230 is disposed on, for example, the first passivation layer 180x and the light blocking member 220. A capping layer 180 is disposed on, for example, the light blocking member 220 and the color filter 230. The capping layer 180 prevents a pigment of the light blocking member 220 and the color filter 230 from flowing into the liquid crystal layer 3.

The pixel electrode 191 is disposed on the capping layer 180, and the second passivation layer 180y and the common electrode 270 are disposed on the pixel electrode 191. The common electrode 270 and the second passivation layer 180y respectively have, for example, the first cutout 271 and the second cutout 181 with substantially the same plane shape as each other. Accordingly, boundaries of the first cutout 271 overlap boundaries of the second cutout 181.

The light blocking member 220 and the color filter 230 are not disposed on the upper panel 200.

Referring to FIG. 5B, the color filter 230 is disposed on the first passivation layer 180x of the lower panel 100. The color filter 230 is disposed at, for example, a region corresponding to the pixel electrode 191. The light blocking member 220 is disposed on the first passivation layer 180x and the color filter 230. The light blocking member 220 is disposed at, for example, a region corresponding to the gate line 121 and the data line 171. The capping layer 180 is disposed on, for example, the light blocking member 220 and the color filter 230. The capping layer 180 prevents a pigment of the light blocking member 220 and the color filter 230 from flowing into the liquid crystal layer 3.

The pixel electrode 191 is disposed on the capping layer 180, and the second passivation layer 180y and the common electrode 270 are disposed on the pixel electrode 191. The common electrode 270 and the second passivation layer 180y respectively have, for example, the first cutout 271 and the second cutout 181 with substantially the same plane shape as each other. Accordingly, boundaries of the first cutout 271 overlap boundaries of the second cutout 181.

The light blocking member 220 and the color filter 230 are not disposed on the upper panel 200.

Referring to FIG. 5C, the liquid crystal display according to the present exemplary embodiment is similar to the liquid crystal display shown in FIG. 5A.

The light blocking member 220 is disposed on, for example, the first passivation layer 180x of the lower panel 100. The light blocking member 220 is disposed at, for example, a region corresponding to the gate line 121 and the data line 171. The color filter 230 is disposed on, for example, the first passivation layer 180x and the light blocking member 220.

The pixel electrode 191 is disposed on, for example, the color filter 230, and the second passivation layer 180y and the common electrode 270 are disposed on the pixel electrode 191. The common electrode 270 and the second passivation layer 180y respectively have, for example, the first cutout 271 and the second cutout 181 with substantially the same plane shape as each other. Accordingly, boundaries of the first cutout 271 overlap boundaries of the second cutout 181.

The light blocking member 220 and the color filter 230 are not disposed on the upper panel 200.

In the liquid crystal display according to the present exemplary embodiment, differently from the liquid crystal display shown in FIG. 5A, the capping layer 180 is not disposed on the light blocking member 220 and the color filter 230.

Figure 6:
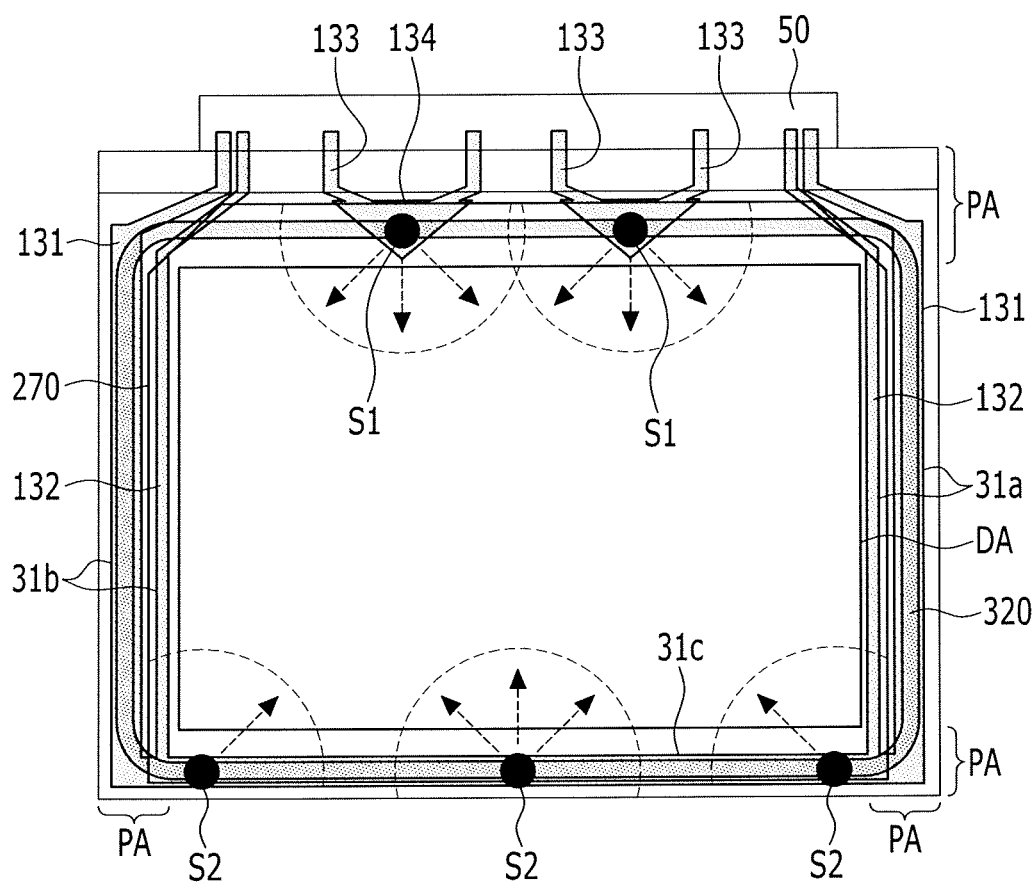
FIG. 6 is a layout view of a portion of a liquid crystal display according to an exemplary embodiment of the present invention.

Next, the plane shape of the common electrode 270 according to an exemplary embodiment of the present invention will be described with reference to FIG. 6. FIG. 6 is a layout view of a portion of a liquid crystal display according to an exemplary embodiment of the present invention.

Referring to FIG. 6, like the liquid crystal display described with reference to FIG. 1 to FIG. 4, the liquid crystal display according to the present exemplary embodiment of the present invention includes, for example, a display area DA where a plurality of pixels are formed and a peripheral area PA near the display area DA.

In the display area DA, the common electrode 270 having the plurality of first cutouts 271 disposed in each pixel area is formed. The plurality of first cutouts 271 disposed in each pixel area are formed at the position, for example, corresponding to the pixel electrode 191 disposed in each pixel area.

In the peripheral area PA, a common voltage application unit 50 applying the common voltage to the common electrode 270 and a plurality of common voltage lines 131, 132, and 133 connected to the common voltage application unit 50 are formed. Among a plurality of common voltage lines 131, 132, and 133, the first common voltage line 131 and the second common voltage line 132 include, for example, longitudinal portions 31*a* and 31*b* disposed at the right and left sides of the display area according to the edge of the display area DA and a transverse portion 31*c* disposed under the display area DA and extending in parallel to the gate line 121. Among a plurality of common voltage lines 131, 132, and 133, the third common voltage line 133 is disposed, for example, close to the common voltage application unit 50 and is disposed in a plurality of regions.

In the peripheral area PA, a common voltage transmission unit 134 extended from the third common voltage line 133 is, for example, further included.

A plurality of the first, second and third common voltage lines 131, 132, and 133 and the common voltage transmission unit 134 may be formed, for example, from the same layer as the gate line 121 or the data line 171.

A first short point S1 is formed on the common voltage transmission unit 134. The first short point S1, for example, electrically connects the third common voltage line 133 and the common electrode 270 to each other.

A plurality of second short points S2 are formed at, for example, a position overlapping the transverse portion 31*c* of the first common voltage line 131 and the second common voltage line 132. The second short point S2, for example, electrically connects the first common voltage line 131 and second common voltage line 132 and the common electrode 270 to each other.

For example, at least a portion of the first short point S1 and the second short point S2 overlaps a sealant 320 adhering the first substrate 110 and the second substrate 210 to each other. The sealant 320 may be, for example, conductive.

As described above, the liquid crystal display according to an exemplary embodiment of the present invention includes, for example, the first, second and third common voltage lines 131, 132, and 133 disposed at the peripheral area PA enclosing the display area DA and are formed from the same layer as the gate line 121 or the data line 171 and a plurality of first short points S1 and a plurality of second short point S2 which electrically connect the common electrodes 270 to each other, thereby preventing a signal delay of the common electrode without the common voltage line being formed in the display area DA.

Figure 7:
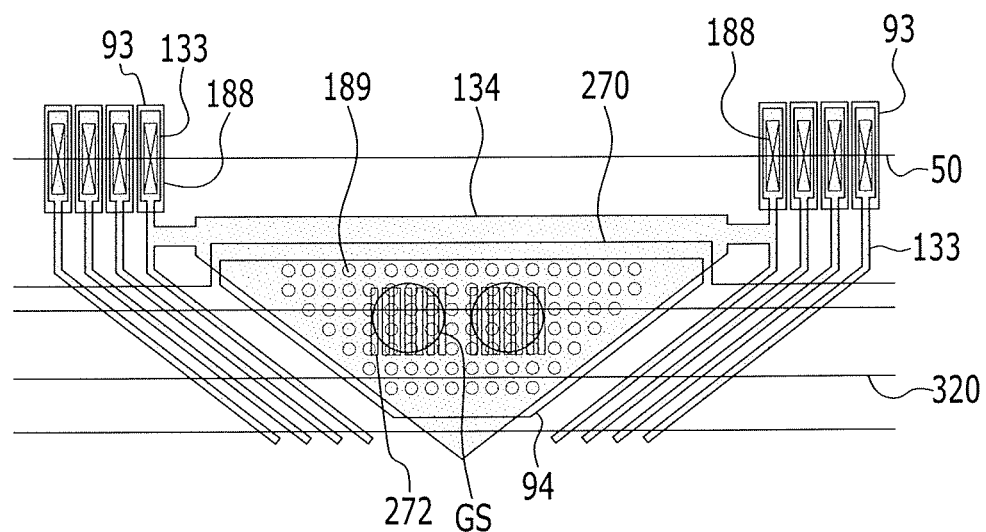
FIG. 7 is an enlarged layout view of a portion of the liquid crystal display of FIG. 6.

Next, a structure of the short point S1 of the liquid crystal display according to an exemplary embodiment of the present invention will be described with reference to FIG. 7 and FIG. 8. FIG. 7 is an enlarged layout view of a portion of the liquid crystal display of FIG. 6, and FIG. 8 is a cross-sectional view of a portion of FIG. 7.

Figure 8:
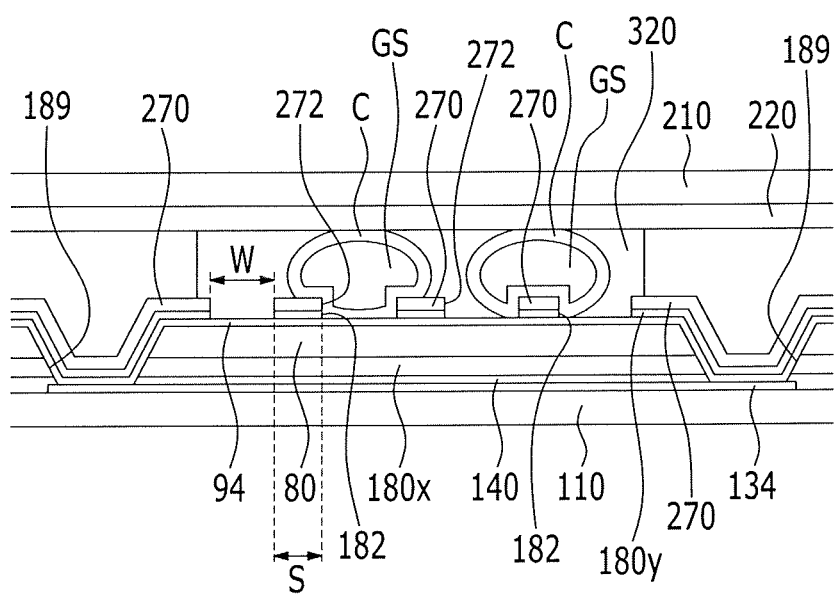
FIG. 8 is a cross-sectional view of a portion of FIG. 7.

Referring to FIG. 7 and FIG. 8, the third common voltage line 133 is exposed by a fourth contact hole 188 formed in the insulating layer and is electrically connected to the common voltage application unit 50 through third contact assistants 93 covering the exposed third common voltage line 133.

The common voltage transmission unit 134 extended from the third common voltage line 133 is formed from, for example, the same layer as the gate line 121. The gate insulating layer 140, the first passivation layer 180*x*, and the organic layer 80 are disposed on the common voltage transmission unit 134. The gate insulating layer 140, the first passivation layer 180*x*, and the organic layer 80 disposed on the common voltage transmission unit 134 have a plurality of fifth contact holes 189 exposing a portion of the common voltage transmission unit 134.

A connecting member 94 is formed on the common voltage transmission unit 134 exposed through a plurality of the fifth contact holes 189. The connecting member 94 is, for example, formed together with the pixel electrode 191 from the same layer. The second passivation layer 180*y* and the common electrode 270 are formed on the connecting member 94. The common electrode 270 and the second passivation layer 180*y* disposed in the peripheral area PA are formed, for example, with substantially the same plane shape as each other. Accordingly, boundaries of the second passivation layer 180*y* overlap boundaries of the common electrode 270. For example, the common electrode 270 has a plurality of the third cutouts 272, and the second passivation layer 180*y* has a plurality of fourth cutouts 182. The third cutout 272 of the common electrode 270 and the fourth cutout 182 of the second passivation layer 180*y* have, for example, substantially the same plane shape as each other. Accordingly, boundaries of third cutout 272 overlap boundaries of the fourth cutout 182.

Through the third cutout 272 of the common electrode 270 and the fourth cutout 182 of the second passivation layer 180*y*, a portion of the connecting member 94 is exposed.

Also, for example, a plurality of short balls GS are formed on the connecting member 94 exposed by the third cutout 272 of the common electrode 270 and the fourth cutout 182 of the second passivation layer 180*y* and the common electrode 270. The short balls GS may be made of, for example, a conductive material such as gold, and the outer surface of the short ball GS may be coated with a conductive coating layer C.

The diameter of the short ball GS may be, for example, larger than the width W of the third cutout 272 of the common electrode 270 and the interval S between the neighboring third cutouts 272. Accordingly, the short balls GS may, for example, electrically connect the connecting member 94 exposed by the third cutout 272 and the common electrode 270 to each other.

The diameter of the short ball GS may be, for example, about 3 μm to about 15 μm.

A plurality of short balls GS overlap, for example, the light blocking member 220, and at least portion of a plurality of short balls GS overlap the sealant 320.

The common voltage applied from the common voltage application unit 50 is transmitted to the common voltage transmission unit 134 through, for example, the third common voltage line 133. In addition, the common voltage applied to the common voltage transmission unit 134 is transmitted to the connecting member 94 through the short balls GS covering the connecting member 94 and the common electrode 270 together, and the common voltage transmitted to the connecting member 94 is transmitted to the common electrode 270.

In the case of the liquid crystal display according to the shown present exemplary embodiment, the third common voltage line 133 and the common voltage transmission unit 134 are formed from, for example, the same layer as the gate line 121. Alternatively, in an exemplary embodiment of the present invention, the third common voltage line 133 and the common voltage transmission unit 134 may instead be formed from, for example, the same layer as the data line 171. In this case, the fifth contact hole 189 exposing the common voltage transmission unit 134 is formed, for example, in the first passivation layer 180x and the organic layer 80.

In the case of the liquid crystal display according to the shown present exemplary embodiment, the connecting member 94 disposed on the common voltage transmission unit 134 and the common electrode 270 are electrically connected to each other by, for example, the short balls GS. Alternatively, in an exemplary embodiment of the present invention, the connecting member 94 disposed on the common voltage transmission unit 134 and the common electrode 270 may be electrically connected to each of the common voltage transmission unit 134 and the common electrode 270 by, for example, a short member such as a metal paste instead of the short balls GS.

Figure 9:
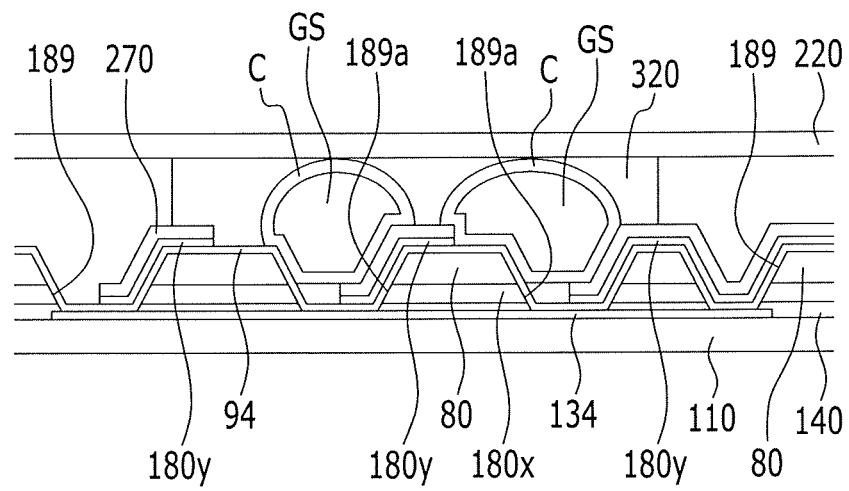
FIG. 9 is a cross-sectional view of a portion of a liquid crystal display according to an exemplary embodiment of the present invention.

Next, a portion of a liquid crystal display according to an exemplary embodiment of the present invention will be described with reference to FIG. 9. FIG. 9 is a cross-sectional view of a portion of a liquid crystal display according to an exemplary embodiment of the present invention.

Referring to FIG. 9, the liquid crystal display according to the present exemplary embodiment is similar to the liquid crystal display shown in FIG. 8.

The common voltage transmission unit 134 extended from the third common voltage line 133 of the liquid crystal display according to the present exemplary embodiment is formed from, for example, the same layer as the gate line 121. The gate insulating layer 140, the first passivation layer 180x, and the organic layer 80 are disposed on the common voltage transmission unit 134. The gate insulating layer 140, the first passivation layer 180x, and the organic layer 80 disposed on the common voltage transmission unit 134 have, for example, a plurality of fifth contact holes 189 and sixth contact holes 189a exposing a portion of the common voltage transmission unit 134. For example, the sixth contact hole 189a overlaps the sealant 320, but the fifth contact hole 189 does not overlap the sealant 320.

The connecting member 94 is formed on the common voltage transmission unit 134 exposed through a plurality of the fifth contact holes 189 and a plurality of the sixth contact holes 189a. The connecting member 94 is formed, for example, together with the pixel electrode 191 from the same layer. The second passivation layer 180y and the common electrode 270 are formed on the connecting member 94.

The second passivation layer 180y and the common electrode 270 are disposed on a portion of the connecting member 94 exposed through the fifth contact hole 189 and the sixth contact hole 189a.

The second passivation layer 180y and the common electrode 270 disposed on the connecting member 94, for example, overlap a portion of the fifth contact hole 189 and the sixth contact hole 189a.

The common electrode 270 and the second passivation layer 180y disposed in the peripheral area PA have, for example, substantially the same plane shape as each other. For example, the common electrode 270 has a plurality of the third cutouts 272, and the second passivation layer 180y has a plurality of the fourth cutouts 182. The third cutout 272 of the common electrode 270 and the fourth cutout 182 of the second passivation layer 180y have, for example, substantially the same plane shape as each other. Accordingly, boundaries of third cutout 272 overlap boundaries of the fourth cutout 182.

By the third cutout 272 of the common electrode 270 and the fourth cutout 182 of the second passivation layer 180y, a portion of the connecting member 94 is exposed.

A plurality of short balls GS are formed on the connecting member 94 exposed by the third cutout 272 of the common electrode 270 and the fourth cutout 182 of the second passivation layer 180y. The short balls GS may be made of, for example, a conductive material such as gold, and the outer surface of the short balls GS may be coated with the conductive coating layer C.

The short balls GS are disposed to cover, for example, the entire sixth contact hole 189a. That is, the diameter of the short ball GS is, for example, larger than the width of the cross-section of the sixth contact hole 189a. Accordingly, the common electrode 270 overlapping the portion of the sixth contact hole 189a and the connecting member 94 that is not covered and is exposed by the common electrode 270 are connected by, for example, the short ball GS.

A plurality of short balls GS, for example, overlap the light blocking member 220, and at least a portion of a plurality of short balls GS overlap the sealant 320.

The common voltage applied from the common voltage application unit 50 is transmitted to the common voltage transmission unit 134 through, for example, the third common voltage line 133. In addition, the common voltage applied to the common voltage transmission unit 134 is transmitted to the connecting member 94, through the short ball GS together covering the connecting member 94 and the common electrode 270. Also, the common voltage transmitted to the connecting member 94 is transmitted to the common electrode 270.

In the case of the liquid crystal display according to the shown present exemplary embodiment, the third common voltage line 133 and the common voltage transmission unit 134 are formed from, for example, the same layer as the gate line 121. Alternatively, in an exemplary embodiment of the present invention, the third common voltage line 133 and the common voltage transmission unit 134 may be formed from, for example, the same layer as the data line 171. In this case, the fifth contact hole 189 and the sixth contact hole 189a exposing the common voltage transmission unit 134 are formed in the first passivation layer 180x and the organic layer 80.

In the case of the liquid crystal display according to the shown present exemplary embodiment, the connecting member 94 disposed on the common voltage transmission unit 134 and the common electrode 270 are electrically connected to each other by, for example, the short balls GS. Alternatively in an exemplary embodiment of the present invention, the connecting member 94 disposed on the common voltage transmission unit 134 and the common electrode 270 may be electrically connected to each other by, for example, a short member such as a metal paste instead of the short balls GS.

Figure 10:
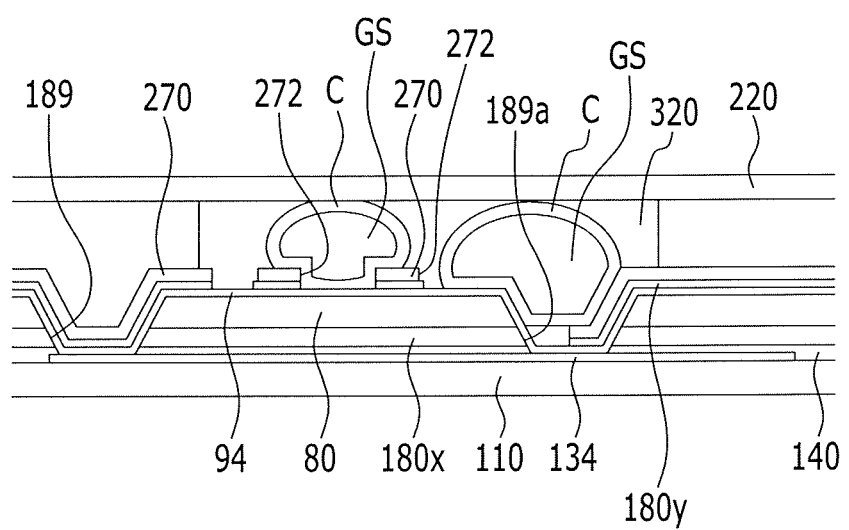
FIG. 10 is a cross-sectional view of a portion of a liquid crystal display according to an exemplary embodiment of the present invention.

Next, a portion of a liquid crystal display according to an exemplary embodiment of the present invention will be described with reference to FIG. 10. FIG. 10 is a cross-sectional view of a portion of a liquid crystal display according to an exemplary embodiment of the present invention.

Referring to FIG. 10, the liquid crystal display according to the present exemplary embodiment is similar to the liquid crystal display t shown in FIG. 8 and FIG. 9.

The common voltage transmission unit 134 extended from the third common voltage line 133 of the liquid crystal display according to the present exemplary embodiment is formed from, for example, the same layer as the gate line 121. The gate insulating layer 140, the first passivation layer 180x, and the organic layer 80 are disposed on the common voltage transmission unit 134. The gate insulating layer 140, the first passivation layer 180x, and the organic layer 80 disposed on the common voltage transmission unit 134 have, for example, a plurality of the fifth contact holes 189 and the sixth contact holes 189a exposing a portion of the common voltage transmission unit 134. The fifth contact hole 189 and the sixth contact hole 189a, for example, overlap the sealant 320.

The connecting member 94 is formed on the common voltage transmission unit 134 exposed through a plurality of the fifth contact holes 189 and a plurality of the sixth contact holes 189a. The connecting member 94 is, for example, formed together with the pixel electrode 191 from the same layer. The second passivation layer 180y and the common electrode 270 are formed on the connecting member 94.

The second passivation layer 180y and the common electrode 270 are disposed on a portion of the connecting member 94 exposed through the sixth contact hole 189a.

The common electrode 270 and the second passivation layer 180y disposed in the peripheral area PA have, for example, substantially the same plane shape as each other. For example, the common electrode 270 has a plurality of the third cutouts 272, and the second passivation layer 180y has a plurality of the fourth cutouts 182. The third cutout 272 of the common electrode 270 and the fourth cutout 182 of the second passivation layer 180y have, for example, substantially the same plane shape as each other. Accordingly, boundaries of third cutout 272 overlap boundaries of the fourth cutout 182.

A portion of the connecting member 94 is exposed by the third cutout 272 of the common electrode 270 and the fourth cutout 182 of the second passivation layer 180y.

A plurality of short balls GS are, for example, formed on the connecting member 94 exposed by the third cutout 272 of the common electrode 270 and the fourth cutout 182 of the second passivation layer 180y and the common electrode 270. The short balls GS may be made of, for example, a conductive material such as gold, and the outer surface of the short ball GS may be coated with the conductive coating layer C.

The short balls GS include, for example, a first short ball GS1 having a relatively small size and a second short ball GS2 having a relatively large size. The second short ball GS2 having the relatively large size is disposed to cover, for example, the entire sixth contact hole 189a. Accordingly, the common electrode 270 overlapping the portion of the sixth contact hole 189a and the connecting member 94 that is not covered and is exposed by the common electrode 270 are, for example, connected by the second short ball GS2.

The first short ball GS1 having the relatively small size connects, for example, the contact hole that does not overlap the connecting member 94 and the common electrode 270.

A plurality of short balls GS, for example, overlap the light blocking member 220, and at least a portion of a plurality of short balls GS overlap the sealant 320.

For example, the common voltage applied from the common voltage application unit 50 is transmitted to the common voltage transmission unit 134 through the third common voltage line 133. In addition, the common voltage applied to the common voltage transmission unit 134 is transmitted to the connecting member 94, and the common voltage transmitted to the connecting member 94 is transmitted to the common electrode 270 through the short balls GS.

In the case of the liquid crystal display according to the shown present exemplary embodiment, the common voltage line 133 and the common voltage transmission unit 134 are formed from, for example, the same layer as the gate line 121. Alternatively, for example, in an exemplary embodiment of the present invention, the common voltage line 133 and the common voltage transmission unit 134 may be formed, for example, from the same layer as the data line 171. In this case, the fifth contact hole 189 and the sixth contact hole 189a exposing the common voltage transmission unit 134 are formed, for example, in the first passivation layer 180x and the organic layer 80.

In the case of the liquid crystal display according to the shown present exemplary embodiment, the connecting member 94 disposed on the common voltage transmission unit 134 and the common electrode 270 are electrically connected to each other by, for example, the short balls GS. Alternatively, in exemplary embodiment of the present invention, the connecting member 94 disposed on the common voltage transmission unit 134 and the common electrode 270 may be electrically connected to each other by, for example, a short member such as a metal paste instead of the short balls GS.

Figure 11:
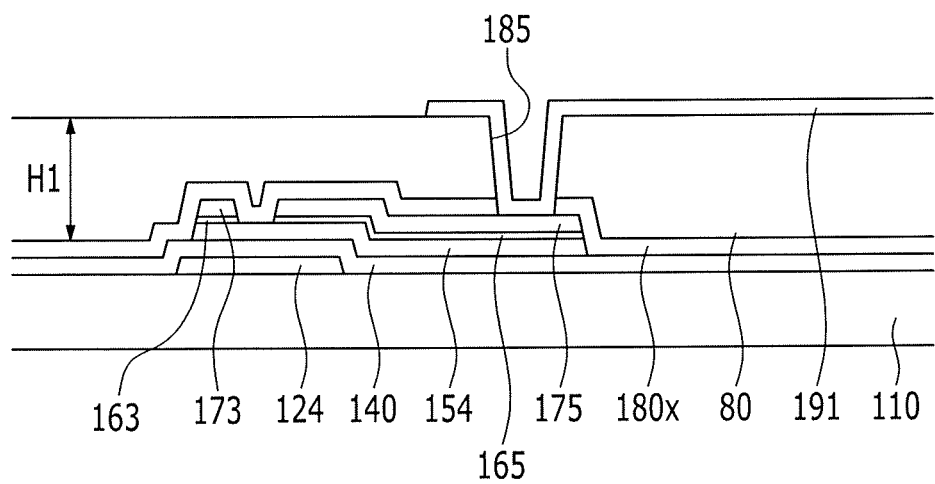
FIG. 11 and FIG. 15 are cross-sectional views sequentially showing a manufacturing method of a liquid crystal display according to an exemplary embodiment of the present invention taken along the line II-II of FIG. 1.
Figure 12:
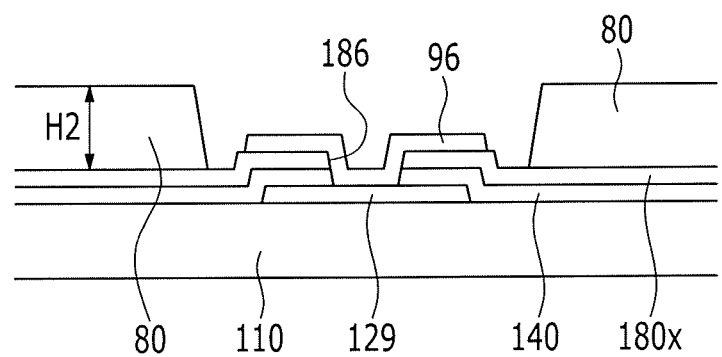
FIG. 12 and FIG. 16 are cross-sectional views sequentially showing a manufacturing method of a liquid crystal display according to an exemplary embodiment of the present invention taken along the line III-III of FIG. 1.
Figure 13:
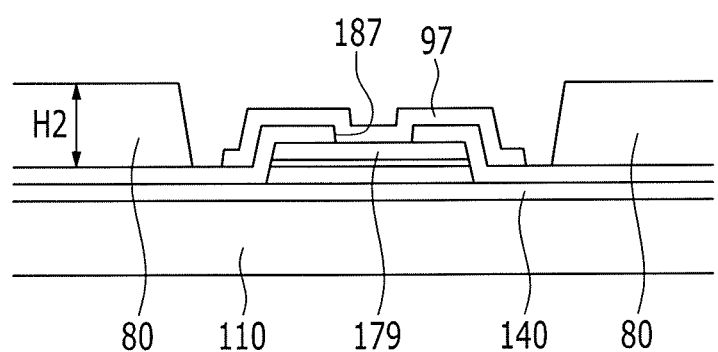
FIG. 13 and FIG. 17 are cross-sectional views sequentially showing a manufacturing method of a liquid crystal display according to an exemplary embodiment of the present invention taken along the line IV-IV of FIG. 1.
Figure 14:
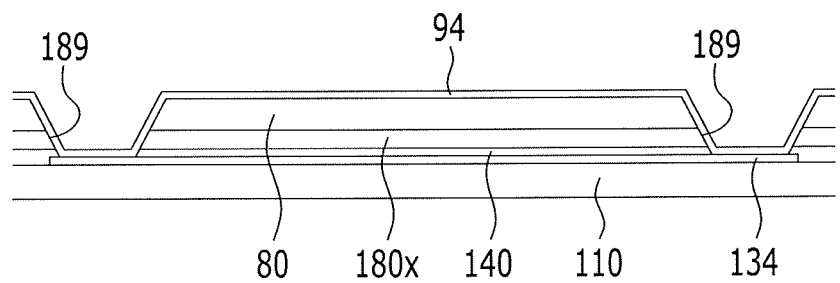
Figure 15:
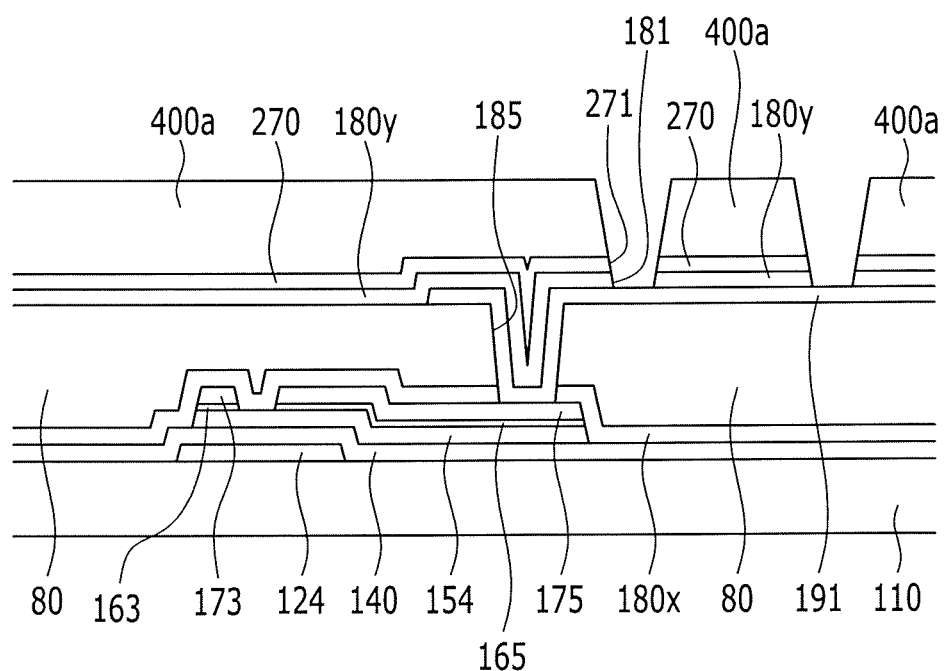
Figure 16:
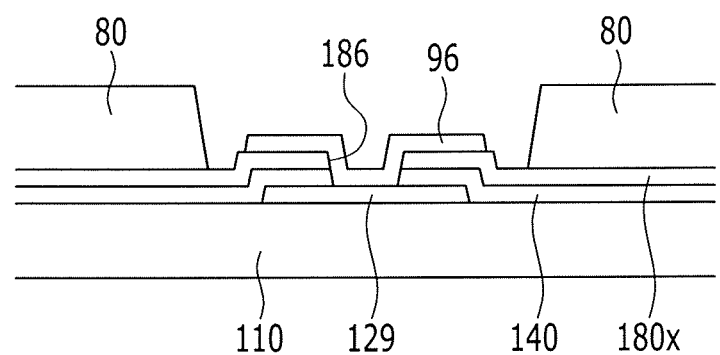
Figure 17:
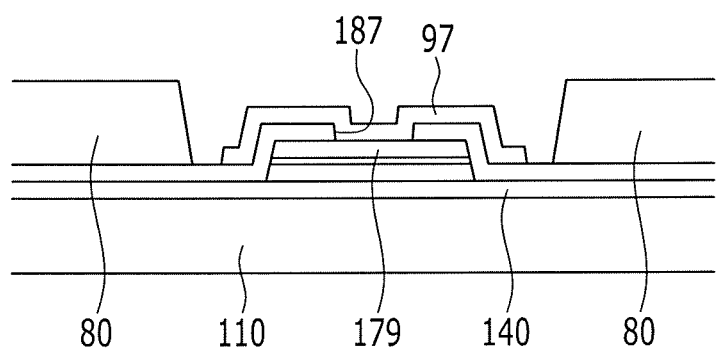
Figure 18:
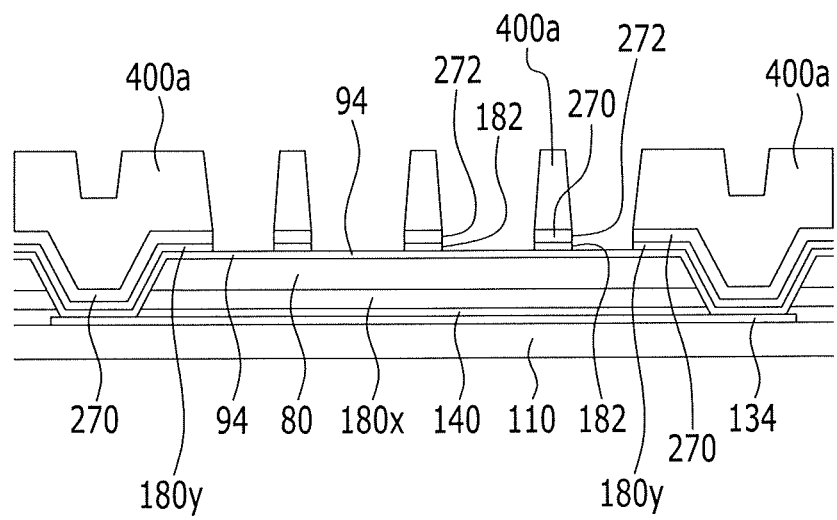

Next, a manufacturing method of a liquid crystal display according to an exemplary embodiment of the present invention will be described with reference to FIG. 11 to FIG. 21 as well as FIG. 1 to FIG. 10. FIG. 11 and FIG. 15 are cross-sectional views sequentially showing a manufacturing method of a liquid crystal display according to an exemplary embodiment of the present invention taken along the line II-II of FIG. 1. FIG. 12 and FIG. 16 are cross-sectional views sequentially showing a manufacturing method of a liquid crystal display according to an exemplary embodiment of the present invention taken along the line III-III of FIG. 1. FIG. 13 and FIG. 17 are cross-sectional views sequentially showing a manufacturing method of a liquid crystal display according to an exemplary embodiment of the present invention taken along the line IV-IV of FIG. 1. FIG. 14 to FIG. 21 are cross-sectional views sequentially showing a manufacturing method of a liquid crystal display according to an exemplary embodiment of the present invention taken along the line VIII-VIII of FIG. 7.

Firstly, referring to FIG. 11 to FIG. 14, a gate conductor including a gate line 121 including, for example, a gate electrode 124 and a gate pad portion 129, and first, second and third common voltage lines 131, 132, and 133, and a common voltage transmission unit 134 is formed on a first insulation substrate 110. A gate insulating layer 140 is formed on the gate conductor. A semiconductor 154, ohmic contacts 163 and 165, and a data conductor (171, 173, 175, and 179) including a data line 171 including a source electrode 173 and a data pad portion 179, and a drain electrode 175 are formed on the gate insulating layer 140. A first passivation layer 180x and an organic layer 80 are formed on the data line 171 and the drain electrode 175. Also, the first contact assistants 96 is formed on the gate pad portion 129 exposed through the first contact hole 186, the second contact assistants 97 is formed on the data pad portion 179 exposed through the second contact hole 187, and a pixel electrode 191 connected to the drain electrode 175 through the first contact hole 185 is formed. Also, a connecting member 94 is formed on the first, second and third common voltage lines 131, 132, and 133 exposed through the third contact hole 185 and on the common voltage transmission unit 134. At this time, the organic layer 80 may be, for example, the color filter, and the light blocking member may be formed, for example, together therewith. Here, the first thickness H1 of the organic layer 80 disposed in a display area where a plurality of pixels are disposed to display an image is, for example, larger than the second thickness H2 of the organic layer 80 disposed at a peripheral area where the gate pad portion 129 or the data pad portion 179 are disposed.

Next, for example, the first contact assistant 96, the second contact assistant 97, and the connecting member 94 are formed on the pixel electrode 191, an insulating layer made of silicon nitride (SiNx) or silicon oxide (SiOx) and a transparent conductor are deposited, and a photosensitive film is deposited thereon. The photosensitive film is patterned by, for example, photolithography to form a photosensitive film pattern 400a, and the transparent conductor and the insulating layer are etched by using the photosensitive film pattern 400a as an etching mask to form a second passivation layer 180y and a common electrode 270 having substantially the same plane shape as each other, as shown in FIG. 15 to FIG. 18.

Next, the photosensitive film pattern 400a is removed.

Figure 19:
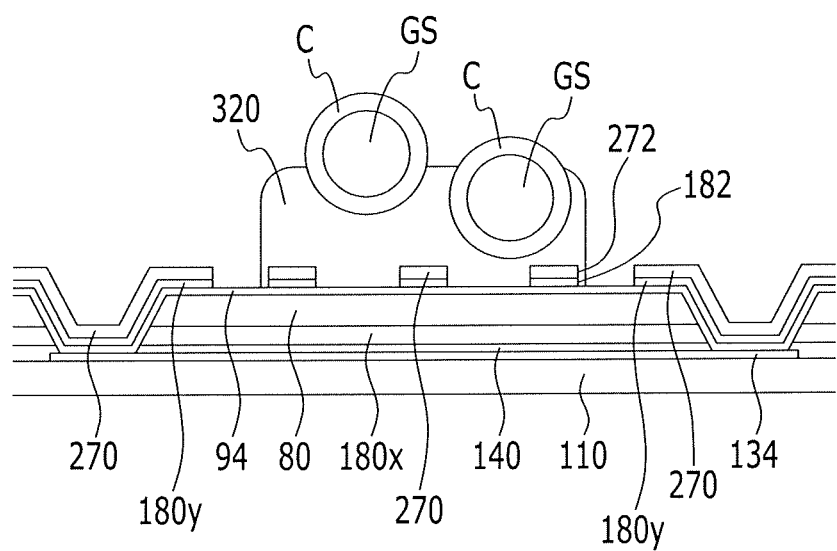

Next, as shown in FIG. 19, a first short point S1 and second short point S2 each including a short ball GS are formed in the peripheral area PA. The short ball GS is formed by, for example, depositing a material layer in which conductive balls are mixed. However, alternatively in an exemplary embodiment of the present invention, the short point may be formed by, for example, using a metal paste such as silver instead of depositing the short ball GS.

Figure 20:
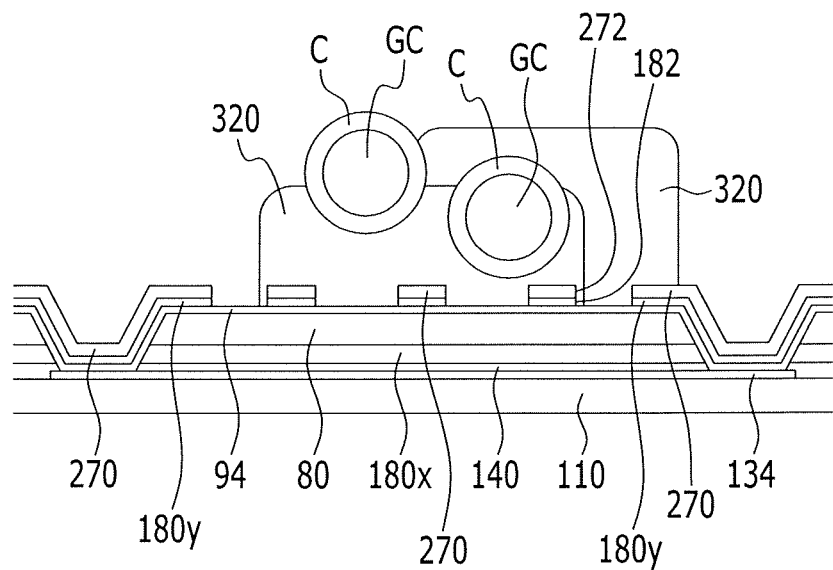
Figure 21:
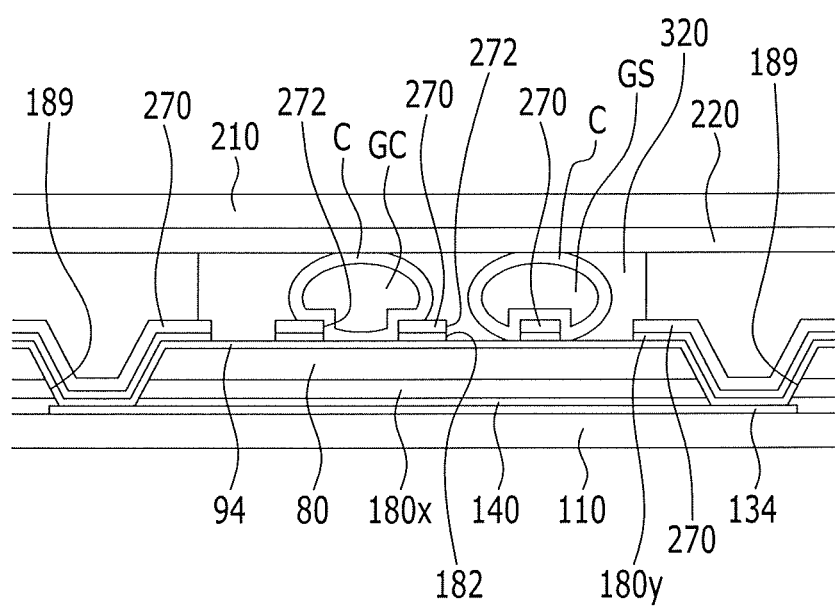

Next, as shown in FIG. 20, a sealant 320 is formed, for example, at a position overlapping at least a portion of the first and second short points S1 and S2.

Like this, after forming the lower display panel 100, the upper display panel 200 is formed, and a liquid crystal layer 3 is injected between the lower and upper display panels 100 and 200, thereby completing the liquid crystal display, as shown in FIG. 1 to FIG. 4 and FIG. 6 to FIG. 10 and FIG. 21. It is noted that alternatively, in an embodiment, the upper display panel 200 may instead be formed prior to the lower display panel 100.

According to the manufacturing method of the liquid crystal display according to an exemplary embodiment of the present invention, the common electrode 270 and the second passivation layer 180y may be, for example, simultaneously formed, and the first short point S1 and the second short point S2 connecting the connecting member 94 disposed on the common voltage line receives the common voltage from the common voltage application unit 50 and the common electrode 270 such that an increase in the manufacturing costs of the liquid crystal display may be prevented, and in addition, the signal delay of the common voltage applied to the common electrode may be prevented.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A liquid crystal display comprising:
a first substrate having a display area configured to display an image and a peripheral area disposed near the display area;
a plurality of gate lines and a plurality of data lines disposed on the display area of the first substrate;
a common voltage line disposed on the peripheral area of the first substrate;
a common voltage transmission unit extending from the common voltage line;
a plurality of thin film transistors respectively connected to the plurality of gate lines and the plurality of data lines;
an organic layer disposed on the plurality of thin film transistors, the common voltage line, and the common voltage transmission unit;
a plurality of pixel electrodes disposed on the organic layer disposed on the display area of the first substrate;
a connecting member disposed on the organic layer disposed on the peripheral area of the first substrate;
a first insulating layer disposed on the pixel electrode and the connecting member;
a common electrode disposed on the first insulating layer,
wherein the common electrode has a plurality of first cutouts formed in the display area,
wherein the first insulating layer has a plurality of second cutouts formed in the display area,
wherein the first cutouts and the second cutouts have substantially a same plane shape as each other,
wherein the common electrode has a plurality of third cutouts formed in the peripheral area,
wherein the first insulating layer has a plurality of fourth cutouts formed in the peripheral area,
wherein the third cutouts and the fourth cutouts having substantially a same plane shape as each other; and
a short point connecting the connecting member disposed in the peripheral area and the common electrode to each other.

2. The liquid crystal display of claim 1, wherein the organic layer has a contact hole exposing the common voltage line and the common voltage transmission unit,
wherein the common voltage line exposed through the contact hole is covered by the connecting member,
wherein at least a portion of the connecting member is exposed through the third cutout and the fourth cutout, and
wherein the short point covers the connecting member exposed through the third cutout and the fourth cutout and the common electrode together.

3. The liquid crystal display of claim 2, wherein the common voltage line is formed from a same layer as the gate line or the data line.

4. The liquid crystal display of claim 3, wherein the short point includes a plurality of short balls.

5. The liquid crystal display of claim 4, wherein at least a portion of the plurality of short balls overlaps the contact hole.

6. The liquid crystal display of claim 5, wherein a diameter of the short ball is larger than a cross-sectional width of the contact hole.

7. The liquid crystal display of claim 4, wherein a diameter of the short ball is larger than a width of the third cutout or an interval between the neighboring third cutouts.

8. The liquid crystal display of claim 4, wherein the plurality of short balls include a first short ball and a second short ball having different diameters from one another.

9. The liquid crystal display of claim 4, further comprising a sealant formed according to the peripheral area, and wherein at least a portion of the short balls overlap the sealant.

10. The liquid crystal display of claim 3, wherein the short point includes a metal paste.

11. The liquid crystal display of claim 1, wherein the common voltage line includes a first common voltage line, a second common voltage line and a third common voltage line, wherein the first common voltage line and the second common voltage line each include a pair of longitudinal portions disposed at right and left sides of the display area and a transverse portion disposed under the display area and extending substantially parallel to the gate line and wherein the common voltage transmission unit extends from the third common voltage line.

12. The liquid crystal display of claim 1, wherein the gate lines include a gate pad portion, wherein the data lines include a data pad portion and wherein the first insulating layer is not disposed on a region of the peripheral area of the first substrate in which the gate pad portions and the data pad portions are disposed.

13. A method of manufacturing a liquid crystal display, comprising:
    providing a first substrate having a display area configured to display an image and a peripheral area disposed near the display area;
    forming a plurality of gate lines and a plurality of data lines on the display area of the first substrate;
    forming a common voltage line and a common voltage transmission unit extending from the common voltage line on the peripheral area of the first substrate;
    forming a plurality of thin film transistors respectively connected to the plurality of gate lines and the plurality of data lines;
    forming an organic layer on the plurality of thin film transistors, the common voltage line, and the common voltage transmission unit;
    forming a plurality of pixel electrodes on the organic layer disposed on the display area of the first substrate;
    forming a connecting member on the organic layer disposed on the peripheral area of the first substrate;
    forming a first insulating layer and a common electrode having a cutout on the pixel electrode and the connecting member; and
    forming a short point connecting the connecting member disposed in the peripheral area and the common electrode to each other.

14. The method of claim 13, wherein the organic layer includes a contact hole exposing the common voltage line and the common voltage transmission unit,
    wherein the connecting member covers the common voltage line exposed through the contact hole,
    wherein at least a portion of the connecting member is exposed by the cutout, and
    wherein the short point covers the connecting member exposed through the cutout and the common electrode together.

15. The method of claim 14, wherein the common voltage line is formed from a same layer as the gate line or the data line.

16. The method of claim 15, wherein the formation of the short point includes disposing a plurality of short balls.

17. The method of claim 16, wherein at least a portion of the plurality of short balls are disposed overlapping the contact hole.

18. The method of claim 17, wherein a diameter of the short ball is larger than a cross-sectional width of the contact hole.

19. The method of claim 16, wherein the diameter of the short ball is larger than a width of the cutout or an interval between neighboring cutouts.

20. The method of claim 16, wherein the plurality of short balls include a first short ball and a second short ball having different diameters from each other.

* * * * *